United States Patent [19]

[11] 3,827,065

Wada

[45] July 30, 1974

[54] WARNING CIRCUIT OF AN ELECTRIC SHUTTER

[75] Inventor: Yasuhiro Wada, Fujimimachi, Japan

[73] Assignee: Kabushikikaisha COPAL, Tokyo, Japan

[22] Filed: Aug. 28, 1972

[21] Appl. No.: 284,151

[30] Foreign Application Priority Data

Aug. 30, 1971 Japan .............................. 46-66478
Aug. 30, 1971 Japan .............................. 46-66479

[52] U.S. Cl. .............................................. 95/10 CT
[51] Int. Cl. .............................................. G03b 7/08
[58] Field of Search .................................. 95/10 CT

[56] References Cited

UNITED STATES PATENTS 3,646,371 2/1972 Flad ................................ 95/10 UX

*Primary Examiner*—Richard M. Sheer
*Assistant Examiner*—Michael L. Gellner
*Attorney, Agent, or Firm*—Hans Berman

[57] ABSTRACT

Warning circuit of an electric shutter for indicating the conditions of over exposure, wavering of camera resulting from too long exposure time, proper exposure range and overflow of the counter. The electric shutter comprises a photoelectric single pulse generating circuit for generating a pulse indicative of exposure time, a reference clock pulse generating circuit and a logic circuit including a pair of binary counters or an up-down counter assembly having a plurality of stages of the counter units for counting the reference clock pulses during the photoelectric single pulse being generated so as to digitally control the exposure time. The warning circuit comprises a pilot lamp means including a flip-flop circuit and a transistor operated thereby for energizing or disenergizing the lamp. The set input of the flip-flop circuit is supplied from the output of a selected stage of the counter units for counting the pulses corresponding to the time of over exposure, proper exposure range, wavering of camera and overflow of the counter so that the flip-flop circuit is actuated by the selected stage to indicate the required condition.

12 Claims, 18 Drawing Figures

WARNING CIRCUIT OF AN ELECTRIC SHUTTER

BACKGROUND OF THE INVENTION

The present invention relates to a warning circuit of an electric shutter, particularly of a TTL type electric shutter digitally controlling the exposure time for warning and indicating the conditions of the over exposure, the photographing under wavering of camera, the proper exposure range and the overflow of the counter in the electric shutter.

In the prior art TTL type electric shutter of a single lens reflex camera heretofore proposed, it is required to memorize the quantity of light to be given for the exposure preliminarily prior to the swinging up of the reflecting mirror of the camera. To this end, various memory circuits have been proposed. However, these memory circuits are of the type in which the quantity of light is memorized as a potential of the electric charge given to a capacitor or a resistor, that is, the quantity of light is memorized by the analog system. Therefore, errors in the memory necessarily occur by the variation in the memorized potential due to leakage of electric current in the capacitor, the transistors, the base plate and other elements in the memory circuit.

In order to overcome the above disadvantages, an electric shutter has been proposed by the present applicant in which the memory of the light quantity for the exposure is made digitally. Such an electric shutter comprises a photoelectric single pulse generating circuit for generating a photoelectric single pulse of a width inversely proportional to the intensity of light from the object to be photographed and received through the objective lens of the camera prior to the opening of the shutter in coupled relation with the shutter releasing mechanism, a reference clock pulse generating circuit for generating sequential pulses of a constant width smaller than the smallest of the photoelectric single pulse determined by the scene brightness, a trigger pulse generating circuit for generating a trigger pulse at the time of opening the shutter in coupled relation with the shutter releasing mechanism, a first AND circuit with its input connected to the output of the photoelectric single pulse generating circuit and the output of the reference clock pulse generating circuit, a second AND circuit with its input connected to the output of the reference clock pulse generating circuit and the output of the trigger pulse generating circuit, a first binary counter having a plurality of stages with its input connected to the output of the first AND circuit so as to count the number of clock pulses during the time the photoelectric single pulse is applied for digitally memorizing the quantity of light to be given in the exposure as the count of pulses, a second binary counter having the corresponding number of stages to that of the first binary counter with its input connected to the output of the second AND circuit so as to count the number of clock pulses after the shutter is opened, exclusive OR circuits with their inputs each connected to the output of the respective stage of the first binary counter and the output of the respective stage of the second binary counter so that the output each of the exclusive OR circuits is made to the low level when the output of the respective stage of the second binary counter reaches the output of the corresponding stage of the first binary counter, a NOR circuit with its input connected to the outputs of the exclusive OR circuits so that the high level output is generated when the outputs of all the exclusive OR circuits are made to the low levels, an RS flip-flop circuit with its reset input terminal connected to the output of the NOR circuit so that the output is made to the low level when the high level output is given to the reset input terminal while the set input terminal thereof is connected to the input of the second AND circuit, and an electromagnetic means connected to the output of the RS flip-flop circuit for arresting the shutter in its opened state after the same has been opened by the operation of the shutter releasing mechanism when the high level output is given from the RS flip-flop circuit, while the shutter is closed by the electromagnetic means when the low level output is given thereto from the RS flip-flop circuit.

The pair of binary counters, the exclusive OR circuits and the RS flip-flop circuit may be replaced by an up-down counter assembly having a plurality of stages of the up-down counter units with the up-counting input connected to the output of the first AND circuits so as to memorize prior to the opening of the shutter the quantity of light for the exposure as the count of the reference clock pulses during the time the photoelectric single pulse is given and with the down-counting input connected to the output of the second AND circuit so as to subtract the count of the clock pulses from the memorized count of the clock pulses after the shutter is opened while the carry output is connected to the input of the first AND circuit and the borrow output is connected to the electromagnetic means and the input of the second AND circuit, so that the borrow output is made to the low level when the count of the subtraction of the pulses reaches the count of the pulses memorized so as to deenergize the electromagnetic means for closing the shutter.

The present invention aims at providing in the above described electric shutter a warning circuit for indicating the over exposure, the proper exposure range, the inappropriate condition of the photographing under wavering of camera due to too long exposure time, and the overflow of the counter of the shutter resulting in erroneous exposure time.

SUMMARY OF THE INVENTION

The object of the present invention is to provide a novel and useful warning circuit for use with the electric shutter of the type described above for indicating at least one of the over exposure condition, the proper exposure range condition, the inappropriate condition for photographing under wavering of camera due to too long exposure time and the improper condition of exposure due to the overflow of the counter of the shutter.

The above object is achieved in accordance with the present invention by providing pilot lamp means including a pilot lamp, a flip-flop circuit and a transistor connected between the pilot lamp and the pilot lamp, the flip-flop circuit being connected to a selected stage of the counter so that the flip-flop circuit is actuated to energize or de-energize the lamp at the time determined by the selected stage of the counter for the indication of the required conditions.

DETAILED DESCRIPTION OF THE PREFERRED EMBODIMENTS

Figure 1:
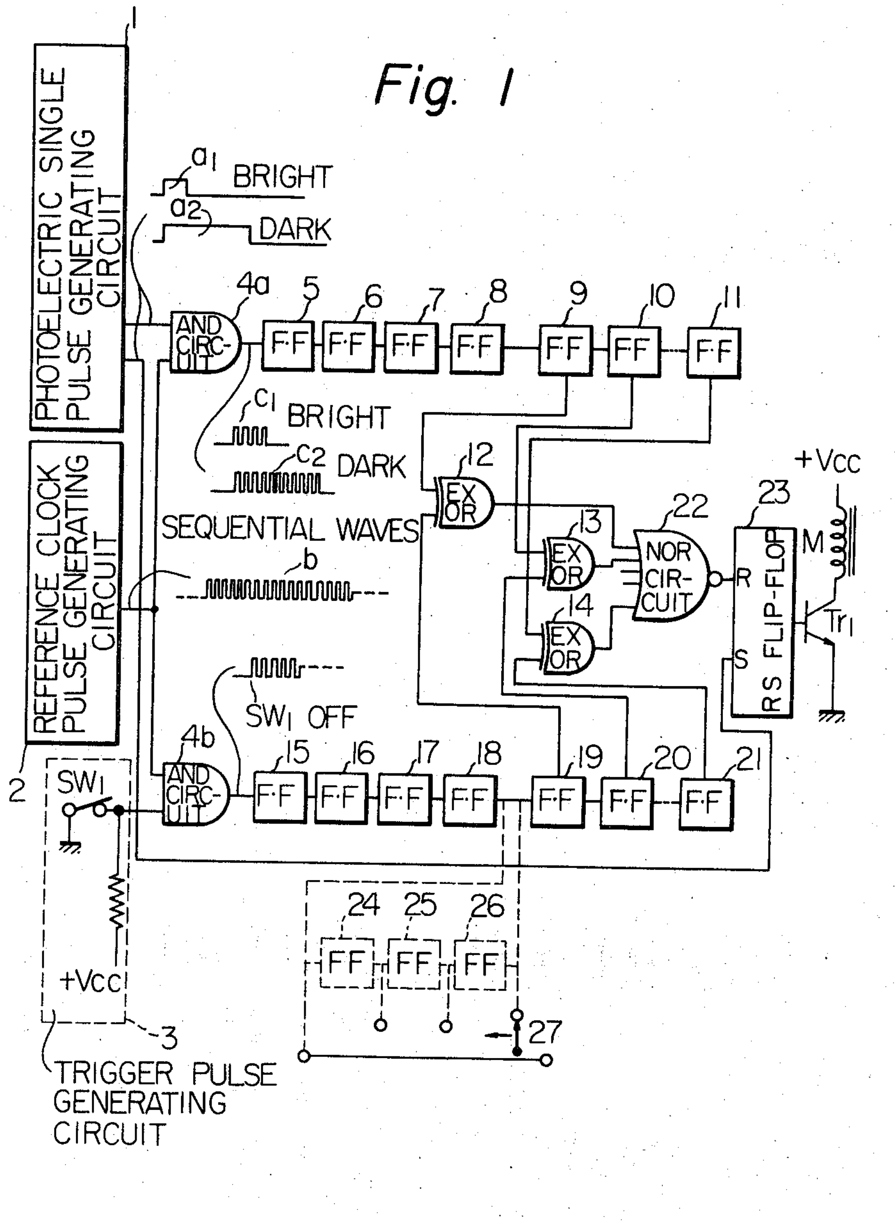
FIG. 1 is a block diagram showing the electric circuit of the electronic shutter to which the present invention is to be applied.
Figures 2, 4:
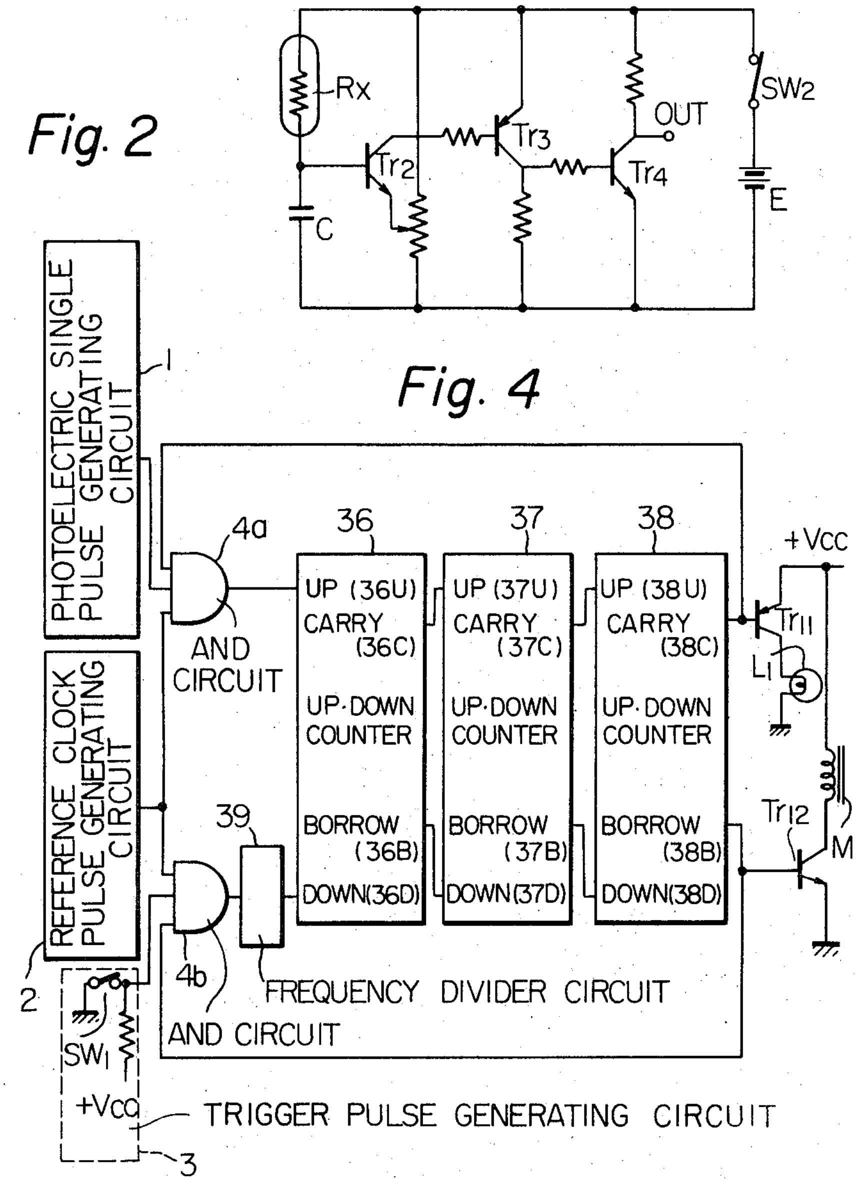
FIG. 2 is a diagram showing an example of the photoelectric single pulse generating circuit incorporated in the electric shutter of FIG. 1.
FIG. 4 is a block diagram showing the electric circuit of a still further modification of the electric shutter of FIG. 1.

Referring now to FIG. 1 showing the electric shutter to which the present invention is to be applied, the shutter comprises a photoelectric single pulse generating circuit 1, a reference clock pulse generating circuit 2, and a trigger pulse generating circuit 3. An example of the photoelectric single pulse generating circuit 1 is shown in FIG. 2. It comprises a photoelectric element Rx adapted to receive light through the objective of the camera and a capacitor C connected in series to the photoelectric element Rx. Both ends of the series circuit of the photoelectric element Rx and the capacitor C are connected to the terminals of an electric source E through a switch $SW_2$. The junction of the photoelectric element Rx and the capacitor C is connected to the base of a transistor $Tr_2$ while the emitter is connected to a variable resistor with its ends connected to the terminals of the electric source E and the collector is connected to the base of a transistor $Tr_3$. The collector of the transistor $Tr_3$ is connected to the base of a transistor $Tr_4$, collectors and the emitters of the transistors $Tr_3$, $Tr_4$ being connected to the terminals of the electric source E as shown.

When the switch $SW_2$ is closed, the high level output "1" or "H" is generated at the output OUT, because the transistor $Tr_4$ is in non-conductive state. However, since the capacitor C is charged through the photoelectric element Rx, the transistors $Tr_2$, $Tr_3$, $Tr_4$ are rendered to be conductive when the voltage of the capacitor C reaches the predetermined value as set by the variable resistor so as to render the output of the output OUT is made "0" or "L". The time during which the output of OUT is kept the high level 1 or H depends upon the resistance of the photoelectric element Rx and, hence, the intensity of the scene brightness. Therefore, the duration of the high level output, i.e., the width of the photoelectric single pulse is made inversely proportional to the intensity of the scene brightness.

The switch $SW_2$ is coupled with the shutter releasing mechanism (not shown) so that it is closed prior to the opening of the shutter during the operation of the shutter releasing mechanism.

The reference clock pulse generating circuit 2 is adapted to generate sequentially reference clock pulses of the width smaller than the smallest of the photoelectric single pulse resulting from the highest brightness of the scene light.

The trigger pulse generating circuit 3 comprises a switch $SW_1$ and an electric source which may be the electric source E of FIG. 2. The switch $SW_1$ is coupled with the shutter releasing mechanism so that it is opened when the shutter is opened so as to supply electric power or the high level output to be described later.

The output of the photoelectric single pulse generating 1 and the output of the reference clock pulse generating circuit 2 are connected to the input of a first AND circuit 4*a* while the output of the reference clock pulse generating circuit 2 and the output of the trigger pulse generating circuit 3 are connected to the input of a second AND circuit 4*b*. Therefore, when the switch $SW_1$ is opened the high level output of the trigger pulse generating circuit 3 is applied to the second AND circuit 4*b*.

The output of the first AND circuit 4*a* is connected to the input of a first binary counter consisting of a plurality of stages of flip-flop circuits 5 to 11 while the output of the second AND circuit 4*b* is connected to the input of a second binary counter consisting of a plurality of stages of flip-flop circuits 15 to 21.

The input of an exclusive OR circuit 12 is connected to the output of the flip-flop circuit 9 in the stages of the first binary counter and to the output of the corresponding flip-flop circuit 19 in the stages of the second binary counter, and the output of the exclusive OR circuit 12 is connected to the input of a NOR circuit 22.

In like manner, the outputs of the flip-flop circuits 10 and 20 are connected to the input of an exclusive OR circuit 13, the output of which is connected to the input of the NOR circuit 22, and the outputs of the flip-flop circuits 11 and 21 are connected to the input of an exclusive OR circuit 14 the output of which is connected to the input of the NOR circuit 22.

The output of the NOR circuit 22 is connected to the reset input terminal R of an RS flip-flop circuit 23 while the set input terminal S thereof is connected to the output of the photoelectric single pulse generating circuit 1.

The output of the RS flip-flop circuit 23 is connected to the base of a transistor $Tr_1$, the emitter and the collector of which is connected to the terminals of an electric source through an electromagnetic means M so as to supply the electric power of the voltage +Vcc thereto when the transistor $Tr_1$ is in the conductive state.

The electromagnetic means M is so constructed that it arrests the shutter in opened state after the same is opened insofar as it is energized while the shutter is closed when the electromagnetic means M is deenergized.

In operation, the photoelectric single pulse ($a_1$ or $a_2$ depending upon the scene brightness) is generated and applied to the first AND circuit 4*a* and the RS flip-flop circuit 23 prior to the opening of the shutter during the operation of the shutter releasing mechanism while the switch $SW_1$ is kept closed so as to render the second AND circuit 4*b* to be inoperative. And, at the same time, the reference clock pulse generating circuit 2 is actuated in coupled relation to the shutter releasing mechanism so as to generate sequential reference clock pulses *b*. Then, the high level output 1 or H of the first AND circuit 4*a* is generated each time the clock pulses *b* is applied thereto during the time the photoelectric single pulse is applied to the first AND circuit 1, while the output of the RS flip-flop circuit 23 is made the high level 1 or H so that the transistor $Tr_1$ is rendered to be conductive to energize the electromagnetic means M thereby arresting the shutter for preventing the closure thereof after the same is opened.

The output $C_1$ of lesser number of pulses is generated by the first AND circuit 4*a* when the scene brightness is high while the output $C_2$ of greater number of pulses is generated when the scene brightness is low as shown in FIG. 1.

The output of the first AND circuit 4*a* is fed to the input of the first binary counter consisting of flip-flop circuits 5 – 11 so as to diminish successively the count of pulses of the output of the first AND circuit 4*a* so that the number of pulses of the output is memorized in the stages of flip-flop circuits particularly in the flip-flop circuits 9 – 11, the flip-flop circuits 5 – 8 being for diminishing the count of pulses before applied to the flip-flop circuits 9 – 11 for the memorization. The outputs of the flip-flop circuits 9 – 11 are applied to the exclusive OR circuits 12 – 14, respectively.

In FIG. 1, the stages of the flip-flop circuits is shown as being three stages comprised of the flip-flop circuits 9 – 11, however, the number of stages may be increased and, in the actual practice, 15 stages are appropriate in consideration for controlling the exposure time ranging 1/1,000 sec. and 32 sec.

When the memorization is completed as described above, since the output of the photoelectric single pulse generating circuit 1 has returned to the low level 0 or L, the output of the first AND circuit 4*a* is rendered to be 0 or L so that the operation of the flip-flop circuits 5 – 11 is made inoperative. During the further operation of the shutter releasing mechanism, the reflecting mirror is swung up or the shutter is opened while the switch $SW_1$ of the trigger pulse generating circuit 3 is opened so as to apply voltage +Vcc to the second AND circuit 4*b* so that the trigger pulse 1 or H is applied to the second AND circuit 4*b* thereby permitting the output of the second AND circuit 4*b* to be applied to the input of the second binary counter consisting of flip-flop circuits 15 – 21 each time the high level output 1 or H of the second AND circuit 4*b* is applied thereto. Thus, the count of the pulses is diminished by the stages of the flip-flop circuits 15 – 21 and when the logic output each of the flip-flop circuits 19 – 21 corresponding to the flip-flop circuits 9 – 11, respectively, is made coincidence with that each of the flip-flop circuits 9 – 11, then the output each of the exclusive OR circuits 12 – 14 is rendered to be 0 or L so that the output of the NOR circuit 22 is made 1 or H. Thus, the reset input 1 or H is applied to the RS flip-flop circuit 23 so that the output of the same is rendered to be 0 or L to make the transistor $Tr_1$ non-conductive thereby deenergizing the electromagnetic means M so as to close the shutter for the proper exposure.

The flip-flop circuits 24 – 26 selectively insertable into the stages of the second binary counter by the slide switch 27 is for introducing the information of the diaphragm opening or the film sensitivity.

In order to widen the range of memorization it is preferred to increase the number of stages of the flip-flop circuits 15 – 18 from four stages to about seven stages.

Figure 3:
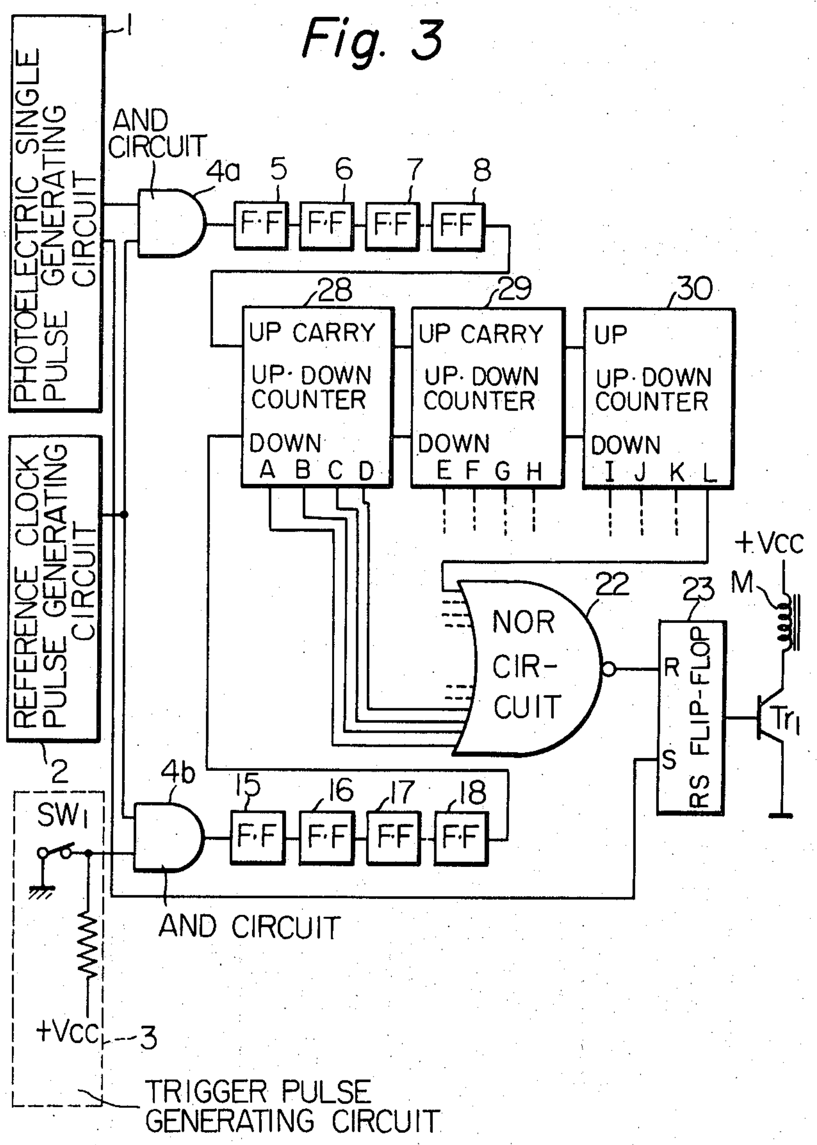
FIG. 3 is a block diagram showing the electric circuit of a modification of the electric shutter of FIG. 1.

FIG. 3 shows a modification of the shutter of FIG. 1. In this embodiment, up-down counter assembly consisting of up-down counter units 28 – 30 connected in cascade connection is replaced for the flip-flop circuits 9 – 11 and 19 – 21 and the exclusive OR circuits 12 – 14.

The output of the flip-flop circuit 8 is applied to the up input of the up-down counter unit 28 so as to effect addition count in the counter assembly while the output of the flip-flop circuit 18 is applied to the down input of the up-down counter unit 28 so as to effect subtraction count in the counter assembly. The outputs of the counter units 28 – 30 are applied to the NOR circuit 22. The operation of the embodiment of FIG. 3 is similar to that of FIG. 1.

FIG. 4 shows a further modification of the shutter shown in FIG. 2.

In this embodiment, the counter assembly is replaced by the up-down counter units 36 – 38 in cascade connection. Frequency divider circuit 39 may be inserted between the second AND circuit 4*b* and the down input of the up-down counter unit 36 so as to widen the range of memory as well as to introduce the information of the diaphragm opening and the film sensitivity.

As shown the carry output 38*c* of the counter unit 38 is fed back to the input of the first AND circuit 4*a* and, at the same time, it is applied to the base of a transistor $Tr_{11}$ the base and the collector of which are connected to the electric source of +Vcc through a lamp $L_1$. The borrow output 38B of the counter unit 38 is fed back to the input of the second AND circuit 4*b* and, at the same time, it is applied to the base of the transistor $Tr_{12}$ corresponding to the transistor $Tr_1$ of FIG. 3.

Figure 5:
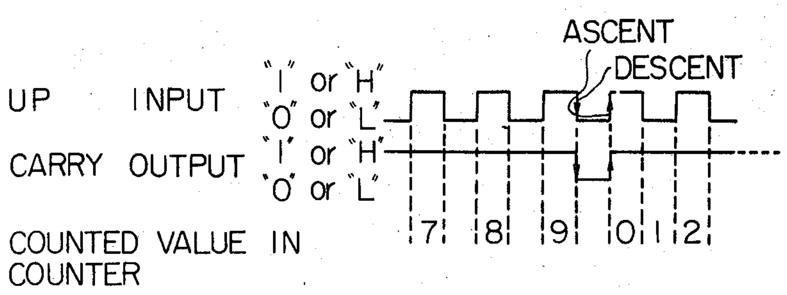
FIGS. 5, 6 are diagrams showing the wave forms of the carry output and the borrow output of the up-down counter unit incorporated in the electric shutter of FIG. 4.

Each time the pulse is applied to the up input 36U of the counter unit 36, the addition count is effected and, when the counted value reaches the counting limit thereof, the carry output 36*c* is changed from 1 or H to 0 or L at the time of occurrence of the descent of the final pulse of the up input 1 of H, and when the succeeding up input is applied, then the carry output is rendered to be 1 or H and kept in this condition as shown in FIG. 5. This applies to the counter units 37 and 38.

Figure 6:
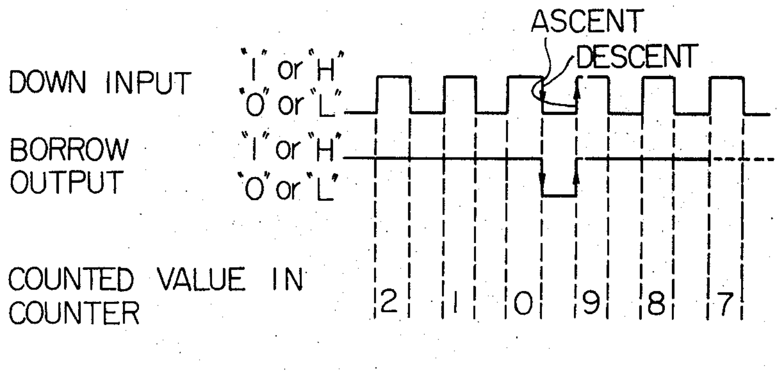

In like manner, each time the pulses are applied to the down input 36D of the counter unit 36, subtraction is effected from the value already counted by the input to the up input 36U, and, when the subtraction results in zero of the counts in the counter unit 36, the borrow output 36B is rendered to be 0 or L at the time of occurrence of the descent of the final pulse applied to the down input 36D, and, when the succeeding down input is applied, then the borrow output is rendered to be 1 or H and kept in this condition as shown in FIG. 6. This also applies to the operation of the counter units 37, 38.

The operation of the embodiment of FIG. 4 is similar to that of FIG. 3, except that, when the scene brightness is too weak so that the addition counting in the up-down counter unit 38 reaches the limit to render the carry output 38*c* to be 0 or L, the low level carry output 38*c* is applied to the input of the first AND circuit 4*a* so as to render the same inoperative thereby keeping the memorized count in the counting units 36 – 38 because no up input is applied thereto. Thus, the transistor $Tr_1$ is rendered to be conductive to energize the lamp $L_1$ so as to indicate the under exposure.

When the switch $SW_1$ is opened in coupled relation to the opening of the shutter, the subtraction of the count memorized in the counter units 36 – 38 is effected by the application of pulses to the down input 36D from the second AND circuit 4*b*, and, when the subtraction results in zero value, the borrow output 38B is rendered to be 0 or L to make the second AND circuit 4*b* inoperative while the electromagnetic means M is deenergized to close the shutter.

Now the warning circuit of the present invention will be described with reference to FIG. 7 in which the shutter is shown for the simplicity of illustration as incorporating therein N bits up-down counter assembly, although it may be replaced by a pair of binary counters as shown in FIG. 1.

In general, the time required for the memory of the proper exposure time must be shortened from the actual exposure time so as to complete the memorization before the operation of the shutter releasing mechanism is terminated. However, a limit exists in shortening the time for memorization and actually the time is limited to the degree of 1/100 – 1/500 sec. Considering that the longest exposure time be 30 sec., for example, 0.23 sec. is required for the memorization assuming that the ratio of shortening the time is 1/128. On the other hand, the operation of the shutter releasing mechanism can be terminated within 0.2 – 0.3 sec. depending upon the operator.

Therefore, various means for preventing the opening of the shutter prior to the completion of the memorization have been proposed so as to avoid the erroneous exposure. However, they have disadvantages in consuming excessive electric power for energizing the pilot lamp or for arresting the electromagnetic means for controlling the actuation of the shutter. Alternatively, when the governor is used to prolong the operation of the shutter releasing mechanism, the shutter chance might be failed.

The present invention avoids the above disadvantages.

Figure 7:
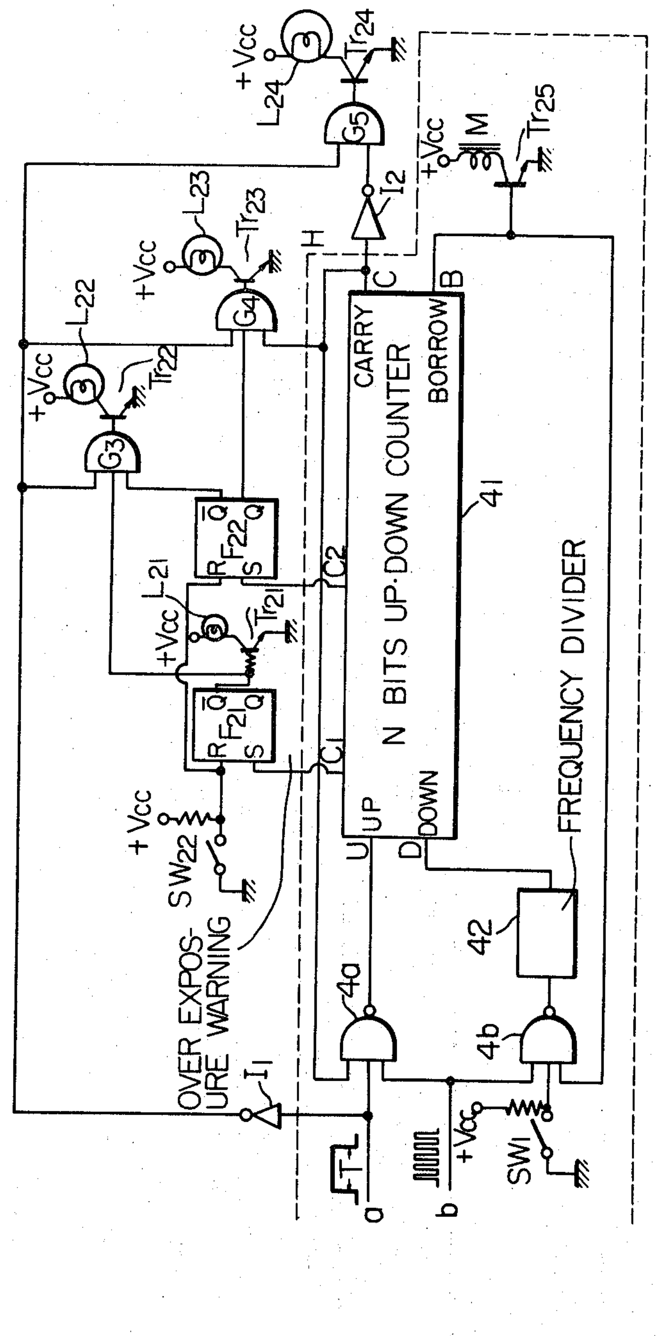
FIG. 7 is a block diagram showing the electric circuit of the warning circuit of the present invention incorporated in the electric shutter.

In FIG. 7, the shutter to which the warning circuit of the present invention is applied is shown surrounded by broken lines. The up-down counter assembly is schematically designated by the numeral 14 and the frequency divider is designated by the numeral 42.

The warning circuit of the present invention comprises a first RS flip-flop circuit $F_{21}$ with its reset input R connected to an electric source +Vcc and a normally opened switch $SW_{22}$ connected to the earth and coupled with the shutter releasing mechanism so that the reset input R is normally applied with the voltage +Vcc, i.e., the high level input H, but, when the switch $SW_{22}$ is instantaneously closed and opened at the initial operation of the shutter releasing mechanism prior to the opening of the shutter, i.e., at the beginning of the memorization, the reset input R receives the low level input L.

The output $\overline{Q}$ of the flip-flop circuit $F_{21}$ is connected to the base of a transistor $Tr_{21}$ the emitter and the collector of which are connected to the terminals of the electric source +Vcc through a lamp $L_{21}$ for warning the over-exposure.

The set input S of the flip-flop circuit $F_{21}$ is connected to the carry output $C_1$ of a selected stage of the counter assembly 41, i.e., to the stage adapted to count 1/1,000 sec., for example. This circuit serves to indicate the over exposure as described later.

The reset input R of a second RS flip-flop circuit $F_{22}$ is connected to the reset input R of the first RS flip-flop circuit $F_{21}$ and the output $\overline{Q}$ is connected to the input of a first AND gate circuit $G_3$ to which the output Q of the first RS flip-flop circuit $F_{21}$ is connected. The output of the first AND gate circuit $G_3$ is connected to the base of a transistor $Tr_{22}$ the emitter and the collector of which are connected to the electric source +Vcc through a lamp $L_{22}$ for indicating the proper exposure range.

The set input S of the second RS flip-flop circuit $F_{22}$ is connected to the carry output $C_2$ of a selected stage of the counter assembly 41, i.e., to the stage adapted to count fairly long exposure time, such as 1/30 sec., dangerous of photographing under wavering of camera.

The output Q of the second RS flip-flop circuit $F_{22}$ is connected to the input of a second AND gate circuit $G_4$ to which they carry output C of the counter assembly is connected.

The output of the second AND gate circuit $G_4$ is connected to the base of a transistor $Tr_{23}$ the emitter and the collector of which are connected to the electric source +Vcc through a lamp $L_{23}$ for indicating the proper exposure range.

The input of a third AND gate circuit $G_5$ is connected to the carry output C of the counter assembly 41 through an inverter $I_2$. The output of the third AND gate circuit $G_5$ is connected to the base of a transistor $Tr_{24}$ the emitter and the collector of which are connected to the electric source +Vcc through a lamp $L_{24}$ for indicating the overflow of the counter assembly 41.

The input each of the first to third AND gate circuits $G_3$ to $G_5$ is connected to the output of the photoelectric single pulse generating circuit through an inverter I, as shown in FIG. 7.

The energization or the deenergization each of the lamps $L_{21}$ to $L_{24}$ is shown in Table 1.

TABLE 1

| Warning or Indication | ——→ Time | | | |
|---|---|---|---|---|
| Over Exposure | 1 | 0 | 0 | 0 |
| Proper Exposure | 0 | 1 | 0 | 0 |
| Wavering of Camera | 0 | 0 | 1 | 0 |
| Overflow | 0 | 0 | 0 | 1 |

Remarks:

"1" indicates the energization of the lamp while "0" indicates the deenergization.

Figure 8:
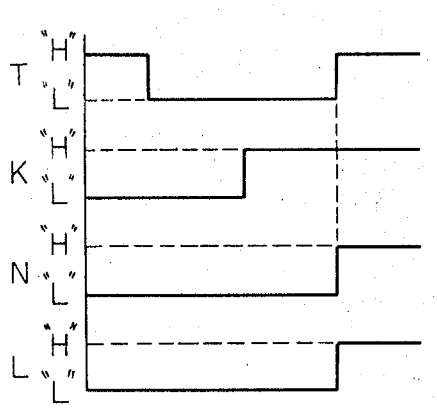
FIG. 8 is a diagram showing the conditions of the various elements in the warning circuit, T showing the output of the inverter I, K showing the outputs of the flip-flop circuit $F_{22}$ and the inverter $I_2$, N showing the outputs of the AND gate circuits $G_3$ to $G_5$ while L shows the energization or the deenergization of the lamps $L_{22}$ to $L_{24}$.

Since the low level output L of the inverter I, is added to each of the AND gate circuits $G_3$ to $G_5$ during the time the photoelectric single pulse is generated, these AND gate circuits are kept in inoperative condition, thereby inhibiting the energization of the lamps $L_{22}$ to $L_{24}$ during the memorization. These conditions are shown in FIG. 8 in which T shows the level of the output of the inverter $I_1$, K showing the level of the outputs Q, $\overline{Q}$ of the second RS flip-flop circuit $F_{22}$ and the level of the output of the inverter $I_2$, N showing the level of the output each of the AND gate circuits $G_3$ to $G_5$, while L shows the condition of the lamps $L_{22}$ to $L_{24}$.

Figure 9:
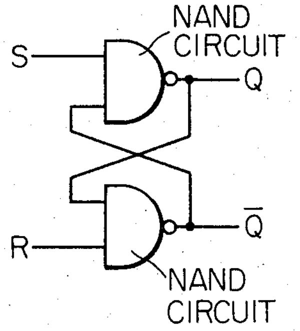
FIG. 9 is a diagram showing the internal electric circuit each of the RS flip-flop circuits $F_{21}$, $F_{22}$.
Figure 10:
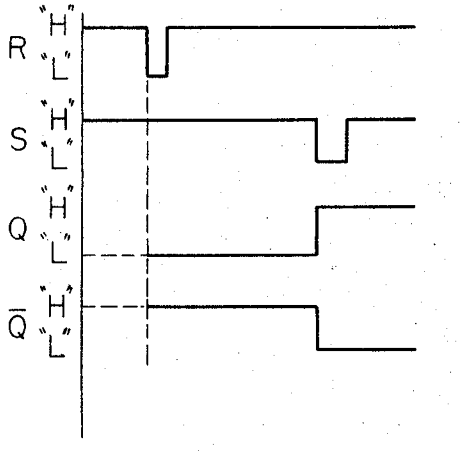
FIG. 10 is a diagram showing the relationship between the input and the output of the circuit of FIG. 9.
Figure 11:
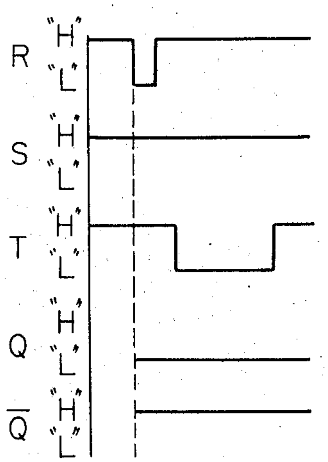
FIG. 11 is a diagram showing the relationship between the input and the output of the flip-flop circuit $F_{21}$ and the time for memorization of the count of the pulses under the condition of the over exposure.

FIG. 9 shows the internal circuit each of the first and second RS flip-flop circuits $F_{21}$, $F_{22}$. The RS flip-flop circuit comprises a pair of NAND gate circuits connected in cross-connection. When the input to the reset input R is made to the low level L by the instantaneous closure of the switch $SW_{22}$ and the input to the set input S is made to the low level L by the output $C_1$ or $C_2$ of the selected stage, then, the output Q which has been kept in the low level L is switched to the high level H, while the output $\overline{Q}$ which has been kept in the high level H is switched to the low level L. These conditions are shown in FIG. 10.

The warning of over exposure will be described. When the shutter releasing mechanism is operated, the switch $SW_{22}$ is instantaneously closed to supply the low level pulse L to the reset input R of the first RS flip-flop circuit $F_{21}$. However, the set input S thereof is still receiving the high level input H from the stage $C_1$. Since the memorization is not yet carried out, $\overline{T}$ in FIG. 8 is being kept in the high level H. The output $\overline{Q}$ of the first RS flip-flop circuit $F_{21}$ is kept in the high level H so that the transistor $Tr_{21}$ is kept conductive to energize the lamp $L_{21}$ thereby indicating the over exposure.

Figure 12:
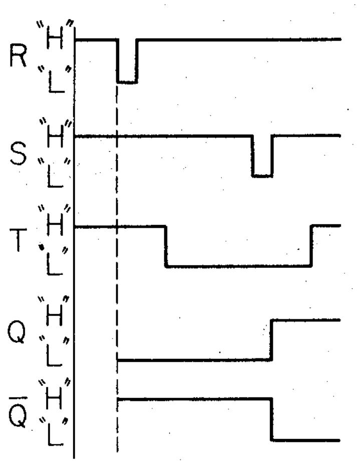
FIG. 12 is a diagram showing the relationship between the input and the output of the RS flip-flop circuit $F_{21}$ and the time for memorization of the count of the pulses under the conditions other than the over exposure.

If the scene brightness is high to avoid the over exposure, then the low level input L is given to the set input S of the RS flip-flop circuit $F_{21}$ by the low level output C. Therefore, the output $\overline{Q}$ is rendered to be low level L to make the transistor $Tr_{21}$ non-conductive thereby extinguishing the lamp $L_{21}$ to indicate that the scene brightness is not under the condition of over exposure. These conditions are shown in FIG. 12.

Figure 13:
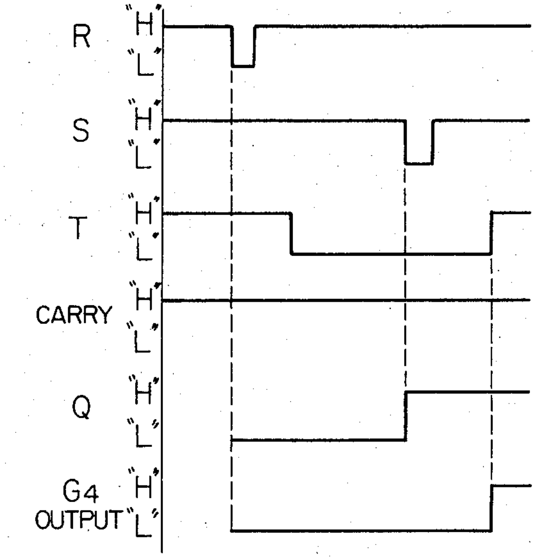
FIG. 13 is a diagram showing the relationship between the input and the output each of the flip-flop circuits $F_{21}$, $F_{22}$ and the time for memorization of the count of pulses under the inappropriate condition of wavering of camera due to too long exposure time.

The warning of the danger of photographing under wavering of camera is effected when the exposure time determined by the shutter is longer than about 1/30 sec. After the low level input L is given to the reset input R of the second RS flip-flop circuit $F_{22}$ by the operation of the switch $SW_{22}$, the output Q thereof is switched to the high level H when the low level pulse L of the carry output $C_2$ is given to the set input S after the counting of the previously described exposure time of about 1/30 sec. Since the carry output C is kept in the high level H unless the overflow takes place in the counter assembly 41, the output of the second AND gate circuit $G_4$ receiving at its input the output $\overline{Q}$ of the second RS flip-flop circuit $F_{22}$ and the carry output C as well as the output of the inverter $I_1$ is switched to the high level H when the photoelectric single pulse terminates to complete the memorization, so that the transistor $Tr_{23}$ is made conductive to energize the lamp $L_{23}$ thereby indicating the dangerous condition of photographing under wavering of the camera. These conditions are shown in FIG. 13.

The indication of the proper exposure range is effected follows. When the scene brightness is not under the condition of over exposure, the output Q of the first RS flip-flop circuit $F_{21}$ is in the high level H. Also, when the scene brightness is not under the dangerous condition of photographing under wavering of the camera, the output $\overline{Q}$ of the second RS flip-flop circuit $F_{21}$ is in the high level H. Further, the output of the inverter $I_1$ is rendered to be the high level H, when the memorization is completed. Therefore, the output of the first AND circuit $G_3$ receiving at its input the above three outputs is made the high level H to render the transistor $Tr_{22}$ to be conductive thereby energizing the lamp $L_{22}$ to indicate that the scene brightness is under the proper exposure range.

The warning of overflow of the counter assembly 41 is effected as follows. When the scene brightness is too low resulting in the memorization of too long exposure time, the carry output C of the counter assembly is made the low level L which is fed back to the first AND gate *4a* so as to inhibit the further counting in the assembly 41 while the negative output (high level H) of the carry output C obtained by the inverter $I_2$ is supplied to the input of the third AND gate circuit $G_5$ together with the negative output of the photoelectric single pulse generating circuit obtained by the inverter $I_1$, therefore, the output of the third AND gate circuit $G_5$ is made the high level H after the termination of the memorization, thereby energizing the lamp $L_{24}$ through the transistor $Tr_{24}$ rendered to be conductive by the high level output H of the third AND gate circuit $G_5$. And, at the same time, the lamp $L_{23}$ is deenergized by the carry output C rendered to be the low level L which is applied to the second AND gate circuit $G_4$.

Figure 14:
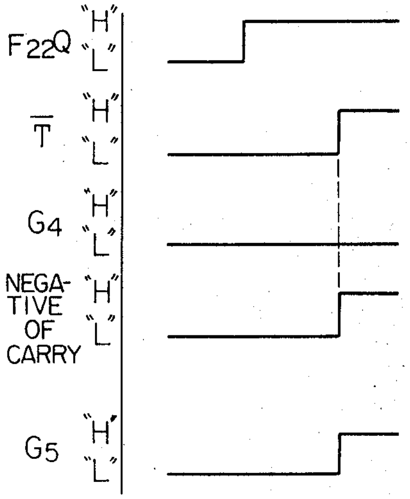
FIG. 14 is a diagram similar to FIG. 13 but showing the relationship under the condition of the overflow of the counter of the shutter.
Figure 15:
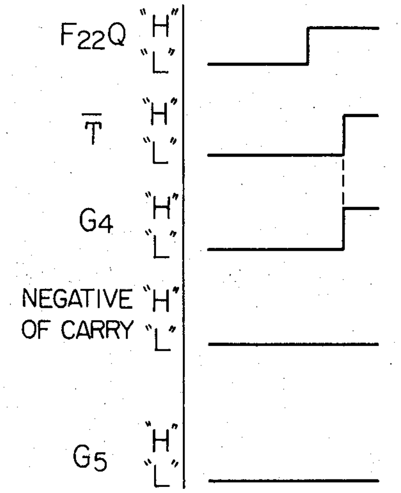
FIG. 15 is a diagram similar to FIG. 14 but showing the relationship under the condition in which the overflow does not take place.

These conditions are shown in FIGS. 14 and 15, FIG. 14 showing the condition of the overflow while FIG. 15 shows the condition of non-over flow of the counter assembly 41.

The above conditions are shown in the table below.

TABLE 2

| | Over Exposure | Wavering of Camera, Overflow | Proper Exposure |
|---|---|---|---|
| Level of Output Q of $F_{21}$ | 0 | 1 | 1 |
| Level of Output $\overline{Q}$ of $F_{22}$ | 0 | 0 | 1 |
| Level of Output of $G_3$ | 0 | 0 | 1 |

The circuit described above can positively avoid the errors caused by variations in temperature, voltage of the electric source because the memorization is effected digitally.

Further, in accordance with the present invention, energization of more than one lamp is inhibited, thereby reducing the consumption of the electric power.

Figure 16:
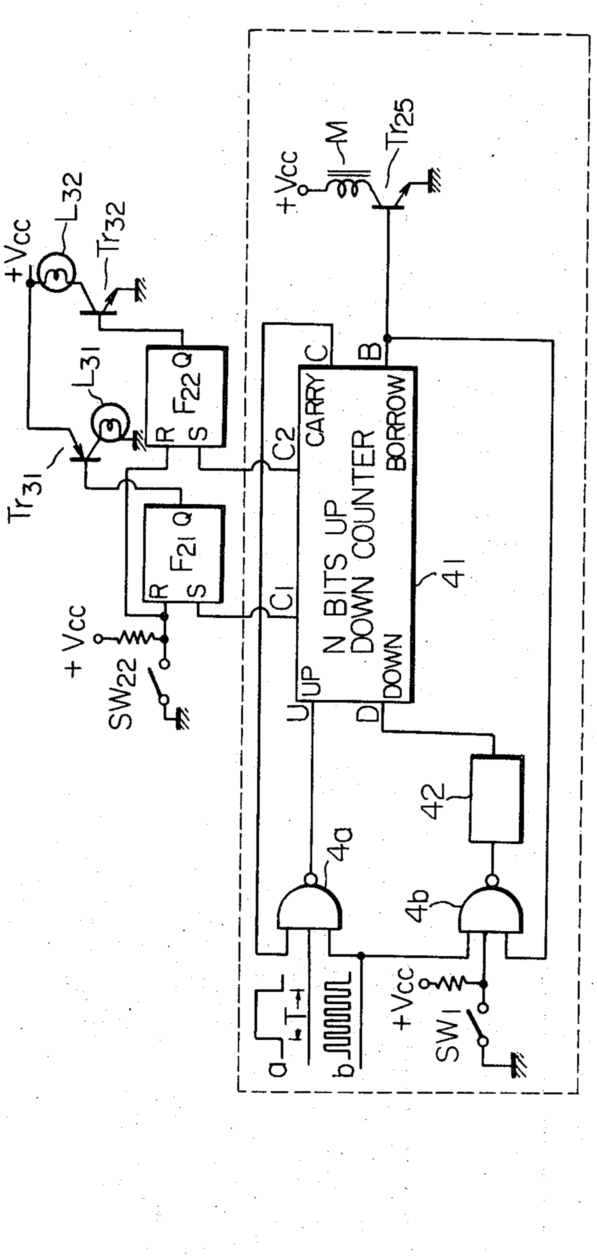
FIG. 16 is a block diagram similar to FIG. 7 but showing the alternative form of the warning circuit of the present invention.

FIG. 16 shows a modification of the warning circuit of FIG. 7.

In this embodiment, the inverters $I_1$, $I_2$ and the AND gate circuits $G_3$ to $G_5$ are dispensed with together with the overflow warning circuit including the lamp $L_{24}$ of FIG. 7 and the output Q of the first RS flip-flop circuit $F_{21}$ is connected to the base of the PNP transistor $Tr_{31}$ connected to the lamp $L_{31}$ corresponding to the lamp $L_{21}$ of FIG. 7, transistor $Tr_{32}$ and the lamp $L_{32}$ corresponding to the transistor $Tr_{22}$ and the lamp $L_{22}$ of FIG. 7, respectively.

The operation of the embodiment of FIG. 16 will be clear from the embodiment of FIG. 7.

Figure 17:
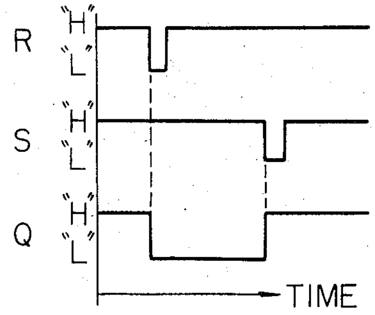
FIG. 17 is a diagram showing the conditions of the input and the output of the flip-flop circuits $F_{21}$, $F_{22}$ shown in FIG. 9.

FIG. 17 shows the conditions of the RS flip-flop circuits $F_{21}$ and $F_{22}$.

Figure 18:
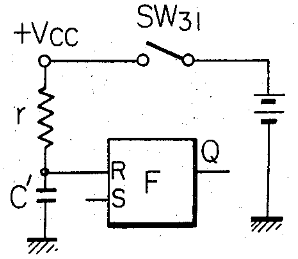
FIG. 18 is a diagram showing an alternative form of the reset switch $SW_{22}$ shown in FIG. 16.

FIG. 18 shows an alternative form of the switch $SW_{22}$. This circuit comprises a resistor *r* and a capacitor C′ connected in series to the resistor *r* to form a timing circuit, the opposite ends of the timing circuit being connected to the electric source +Vcc through the switch $SW_{31}$ of the electric source while the junction of the resistor *r* and the capacitor *c* is connected to the reset input R of the RS flip-flop circuit. When the switch $SW_{31}$ is closed, the level of the reset input R is made instantaneously low and, after the capacitor C′ has been charged, the level of the reset input R is again returned to the high level, thereby acting as the switch $SW_{22}$.

It is apparent in the embodiments described above that the AND circuits 4*a*, 4*b* in the electric shutter may be replaced by NAND circuits, respectively, and transistors and other elements may be changed to alternative types insofar as the same results are obtained.

I claim:

1. A digital circuit for controlling the exposure time of a TTL type electric shutter, said circuit having a first pulse generating circuit for generating a single pulse having a width inversely proportional to the intensity of the scene brightness prior to the opening of said shutter;

a second pulse generating circuit for generating a train of clock pulses each of a constant width which is narrower than the narrowest of said single pulses determined by the scene brightness;

a first AND circuit having one input thereof connected to the output of said first pulse generating circuit and another input connected to the output of said second pulse generating circuit;

a third pulse generating circuit for generating a trigger pulse at the time of opening of said shutter;

a second AND circuit having one input connected to the output of said second pulse generating circuit and another input connected to the output of said third pulse generating circuit;

a first binary counter comprising a plurality of bistable stages connected in series with each other, the input of said first binary counter being connected to the output of said first AND circuit thereby to memorize the number of clock pulses in said train during the time said single pulse is being generated;

a second binary counter comprising a plurality of bistable stages connected in series with each other, the input of said second binary counter being connected to the output of said second AND circuit thereby to begin counting clock pulses from said second pulse generating circuit when said trigger pulse is generated during operation of said shutter;

a plurality of exclusive OR circuits each respectively connected to a corresponding stage of said first and said second binary counters;

a NOR circuit with its inputs connected to the outputs of said plurality of exclusive OR circuits thereby to generate a high level output when the count in said second binary circuit reaches the count memorized in said first binary circuit;

a bistable circuit with its reset input connected to the output of said NOR circuit and its set input connected to the output of said first pulse generating circuit;

electromagnetic means, connected to the output of said bistable circuit, said electromagnetic means arresting said shutter in the opened state if the same is opened while the output of said bistable circuit is HIGH, said shutter being closed for proper exposure when the output of said bistable circuit is switched to LOW by the output of the NOR circuit connected thereto; and an indicating circuit connected to the output of a selected stage of said first binary counter for indicating to the operator of the camera when exposure conditions are inappropriate, said indicating circuit being connected to a lamp indicating means.

2. The digital circuit according to claim 1, wherein said indicating circuit includes an over-exposure warning circuit comprising a first bistable circuit with its set input connected to the output of a selected stage of said first binary counter, and its reset input connected to a switch means which is coupled to said shutter and actuated therewith for applying a low level signal to said reset input prior to opening of said shutter; and a transistor circuit connected between the output of said first bistable circuit and said lamp means.

3. A digital circuit according to claim 2, wherein said switch means comprises a resistor and a capacitor in series with the junction of said resistor and said capacitor being connected to the reset input of said first bistable circuit, and a switch for applying a potential to said series circuit prior to the opening of said shutter.

4. The digital circuit according to claim 1, wherein said indicating circuit includes a proper exposure range indicating circuit comprising a first bistable circuit with its reset input connected to a switch means which is coupled to said shutter and actuated thereby for applying a low level signal to said reset input prior to opening of said shutter and its set input connected to the output of a selected stage of said first binary counter;

a second bistable circuit with its set input connected to the output of another selected stage of said first binary counter and its reset input connected to said switch means;

a first AND gate circuit with inputs connected to the output each of said first and said second bistable circuits as well as to the inverted output of said first pulse generating circuit; and a transistor circuit connected between the output of said first and gate circuit and said lamp means.

5. A digital circuit according to claim 1, wherein said indicating circuit includes a warning circuit to caution the user against attempting a hand-held exposure, said circuit including a first bistable circuit with its set input connected to the output of a selected stage of said first binary counter and its reset input connected to a switch means which is coupled to said shutter and actuated therewith for applying a low level signal to said reset input prior to opening of said shutter;

a third AND gate circuit with an input connected to the output of said first bistable circuit and the output of said first binary counter as well as to the inverted output of said first pulse generating circuit; and a transistor circuit connected between the output of said third AND gate circuit and said lamp means.

6. A digital circuit according to claim 1, wherein said indicating circuit includes a warning circuit to notify the user of an overflow in the counter, said circuit comprising a third AND gate circuit with an input connected to the inverted output of said first pulse generating circuit and another input connected to the inverted output of said first binary counter; and a transistor circuit connected between the output of said third AND gate circuit and said lamp means.

7. A digital circuit for controlling the exposure time of a TTL type electric shutter, said circuit having a first pulse generating circuit for generating a single pulse having a width inversely proportional to the intensity of the scene brightness prior to the opening of said shutter;

a second pulse generating circuit for generating a train of clock pulses each of a constant width which is narrower than the narrowest of said single pulses determined by the scene brightness;

a first AND circuit having one input thereof connected to the output of said first pulse generating circuit and another input connected to said second pulse generating circuit;

a third pulse generating circuit for generating a trigger pulse at the time of opening of said shutter;

a second AND circuit with one input thereof connected to the output of said second pulse generating circuit and another input connected to said third pulse generating circuit;

an up-down counter comprising a plurality of stages connected in cascade with its UP input connected to the output of said first AND circuit and its CARRY output connected to a third input of said first AND circuit, the DOWN input thereof being connected to the output of said second AND circuit, the BORROW output thereof being connected to a third input of said second AND circuit;

electromagnetic means connected to the BORROW output of said up-down counter, said electromagnetic means arresting said shutter in the opened state if the same is opened while the BORROW output of said up-down counter is HIGH, said shutter being closed for proper exposure when the BORROW output is switched to LOW upon complete counting of the down input of said up-down counter; and an indicating circuit connected to the carry output of a selected stage of said up-down counter for indicating to the operator of the camera when exposure conditions are inappropriate, said indicating circuit being connected to a lamp indicating means.

8. The digital circuit according to claim 7, wherein said indicating circuit includes an over-exposure warning circuit which comprises a first bistable circuit with its set input connected to the carry output of a selected stage of said up-down counter, and its reset input connected to a switch means which is coupled to said shutter and actuated therewith for applying a low level signal to said reset terminal prior to opening of said shutter; and a transistor circuit connected between the output of said first bistable circuit and said lamp means.

9. A digital circuit according to claim 8, wherein said switch means comprises a resistor and a capacitor in series with the junction of said resistor and said capacitor being connected to the reset input of said first bistable circuit; and a switch for applying a potential to said series circuit prior to the opening of said shutter.

10. The digital circuit according to claim 7, wherein said indicating circuit includes a proper exposure range indicating circuit comprising a first bistable circuit with its reset input connected to a switch means which is coupled to said shutter and actuated thereby for applying a low level signal to said reset input prior to opening of said shutter while its set input is connected to the carry output of a selected stage of said up-down counter;

a second bistable circuit with its set input connected to the carry output of another selected stage of said up-down counter and its reset input connected to said switch means;

a first AND gate circuit with inputs respectively connected to the outputs of said first and said second bistable circuits as well as to the inverted output of said first pulse generating circuit; and a transistor circuit connected between the output of said first AND gate circuit and said lamp means.

11. The digital circuit according to claim 7, wherein said indicating circuit includes a warning circuit to caution the user against attempting a hand-held exposure, said circuit including a first bistable circuit with its set input connected to the carry output of a selected stage of said up-down counter and its reset input connected to a switch means which is coupled to said shutter and actuated therewith for applying a low level signal to said reset input prior to opening of said shutter;

a third AND gate circuit having an input connected to the output of said first bistable circuit and the carry output of said up-down counter as well as to the inverted output of said first pulse generating circuit; and a transistor circuit connected between the output of said third AND gate circuit and said lamp means.

12. The digital circuit according to claim 7, wherein said indicating circuit includes a warning circuit to notify the user of an overflow in the counter, said circuit comprising a third AND gate circuit with an input connected to the inverted output of said first pulse generating circuit and another input connected to the inverted carry output of said up-down counter; and a transistor circuit connected between the output of said third AND gate circuit and said lamp means.

* * * * *